United States Patent
Touma et al.

(10) Patent No.: US 8,493,381 B1
(45) Date of Patent: Jul. 23, 2013

(54) METHODS AND SYSTEMS FOR GEOMETRY COMPRESSION

(75) Inventors: Costa Touma, Santa Clara, CA (US); Emil Praun, Fremont, CA (US); Paul Strauss, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1108 days.

(21) Appl. No.: 12/421,148

(22) Filed: Apr. 9, 2009

Related U.S. Application Data (60) Provisional application No. 61/044,874, filed on Apr. 14, 2008.

(51) Int. Cl.
*G06T 15/10* (2011.01)

(52) U.S. Cl.
USPC ........... 345/419; 345/420; 345/426; 345/428; 345/429; 382/232; 382/165; 382/238

(58) Field of Classification Search
USPC ................. 382/242, 166, 243, 246, 247, 238, 382/231; 345/420, 426, 429, 581
See application file for complete search history.

(56) References Cited

U.S. PATENT DOCUMENTS

| | | | | |
|---|---|---|---|---|
| 5,793,371 A | * | 8/1998 | Deering | 345/418 |
| 5,867,167 A | * | 2/1999 | Deering | 345/419 |
| 5,933,153 A | * | 8/1999 | Deering et al. | 345/501 |
| 6,088,034 A | * | 7/2000 | Deering | 345/420 |
| 6,167,159 A | * | 12/2000 | Touma et al. | 382/242 |
| 6,262,737 B1 | * | 7/2001 | Li et al. | 345/419 |
| 6,525,722 B1 | * | 2/2003 | Deering | 345/419 |
| 6,614,428 B1 | * | 9/2003 | Lengyel | 345/420 |
| 6,747,644 B1 | * | 6/2004 | Deering | 345/420 |
| 7,046,856 B2 | * | 5/2006 | Feria et al. | 382/248 |
| 7,342,580 B1 | * | 3/2008 | Peterson | 345/418 |
| 8,249,371 B2 | * | 8/2012 | Dogaru | 382/238 |
| 2004/0078352 A1 | * | 4/2004 | Fujime | 706/26 |
| 2005/0168460 A1 | * | 8/2005 | Razdan et al. | 345/419 |
| 2009/0097760 A1 | * | 4/2009 | Bezryadin | 382/232 |
| 2010/0266216 A1 | * | 10/2010 | Choe | 382/233 |
| 2010/0266217 A1 | * | 10/2010 | Lee et al. | 382/238 |
| 2012/0063678 A1 | * | 3/2012 | Asikainen | 382/165 |

OTHER PUBLICATIONS

Gabriel Taubin, "3D Geometry Compression and Progressive Transmission",The Eurographics Association and Blackwell Publishers 1999,pp. 16.*

* cited by examiner

*Primary Examiner* — Mekonen Bekele
(74) *Attorney, Agent, or Firm* — Marshall, Gerstein & Borun LLP (57) ABSTRACT

Methods and systems for geometry compression. In an embodiment, the present invention compresses three dimensional geometry by (1) extracting at least one primitive from the three dimensional geometry, where each extracted primitive includes vertices and property indices that associate properties with the vertices; (2) quantizing, for each extracted primitive, the properties to a fixed grid; (3) converting, for each extracted primitive, the properties from a first data type to a second data type; and (4) encoding property indices, where the encoded property indices and quantized and converted properties are transmitted via a communication network in order to display the three dimensional geometry.

22 Claims, 8 Drawing Sheets

|  | (x, y, z) |
|---|---|
| Point index 0: | (1, 0, 0) |
| Point index 1: | (1, 1, 0) |
| Point index 2: | (0, 1, 0) |
| Point index 3: | (0, 0, 0) |
| Point index 4: | (1, 1, 1) |
| Point index 5: | (0, 1, 1) |
| Point index 6: | (0, 0, 1) |
| Point index 7: | (1, 0, 1) |

First example encoded point index array

Primitive 710: [ 0:0, 1:0, 4:0, 7:0, -1:5,
Primitive 712: 1:4, 0:6, 3:0, 2:0, -1:5,
Primitive 714: 1:5, 2:3, 5:0, 4:11, -1:5,
Primitive 716: 2:4, 3:9, 6:0, 5:6, -1:5,
Primitive 718: 4:7, 5:3, 6:5, 7:20, -1:5,
Primitive 720: 0:19, 7:3, 6:5, 3:12, -1:5 ]

| Original Point Index | Renumbered Point Index | (x, y, z) |
|---|---|---|
| 0 | 0 | (1, 0, 0) |
| 1 | 1 | (1, 1, 0) |
| 2 | 5 | (0, 1, 0) |
| 3 | 4 | (0, 0, 0) |
| 4 | 2 | (1, 1, 1) |
| 5 | 6 | (0, 1, 1) |
| 6 | 7 | (0, 0, 1) |
| 7 | 3 | (1, 0, 1) |

730

Second example encoded point index array

Primitive 710:   [ 0:0, 1:0, 2:0, 3:0, -1:5,
Primitive 712:   1:4, 0:6, 4:0, 5:0, -1:5,
Primitive 714:   1:5, 5:3, 6:0, 2:11, -1:5,
Primitive 716:   5:4, 4:9, 7:0, 6:6, -1:5,
Primitive 718:   2:7, 6:3, 7:5, 3:20, -1:5,
Primitive 720:   0:19, 3:3, 7:5, 4:12, -1:5 ]

FIG. 7B

METHODS AND SYSTEMS FOR GEOMETRY COMPRESSION

FIELD OF THE INVENTION

The present invention relates to three dimensional graphics.

BACKGROUND OF THE INVENTION

Data representing three dimensional objects in an application may consist of a large number of bits. If, for instance, this data is streamed over a network, such as the Internet, undesired delays in receiving the data may result due to large packet sizes. This may be especially troublesome if a large number of three dimensional objects need to be sent in a short amount of time or if a quick turnaround is desired between requesting and receiving the data. In either case, the application may fail to properly render the objects if delays result.

What are needed are techniques that help reduce and/or eliminate these problems that occur when streaming data.

BRIEF SUMMARY

This invention relates to geometry compression. A system embodiment of this invention compresses three dimensional geometry. A system embodiment includes a primitive extractor, a property encoder, and an index encoder. The primitive extractor extracts at least one primitive from the three dimensional geometry, where each extracted primitive includes vertices and property indices that associate properties with the vertices. The property encoder, for each extracted primitive, quantizes the properties to a fixed grid, and converts the properties from a first data type to a second data type. The index encoder encodes property indices, where the encoded property indices are based on any multiple appearances of the respective property index and a position of the respective property index relative to other property indices, and where the encoded property indices and quantized and converted properties are transmitted via a communication network in order to display the three dimensional geometry.

A method embodiment of this invention compresses three dimensional geometry. The method embodiment includes extracting at least one primitive from the three dimensional geometry, where each extracted primitive includes vertices and property indices that associate properties with the vertices, quantizing, for each extracted primitive, the properties to a fixed grid, converting, for each extracted primitive, the properties from a first data type to a second data type, and encoding property indices, where the encoded property indices and quantized and converted properties are transmitted via a communication network in order to display the three dimensional geometry.

In this way, the number of bits streamed over a network may be reduced while still properly rendering the streamed three dimensional objects. This reduction in bits speeds up the streaming of three dimensional geometry.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

The present invention relates to geometry compression. This can include reducing the data size of three dimensional geometry to speed up streaming. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe a system and method for compressing geometry in greater detail.

System

Figure 1:
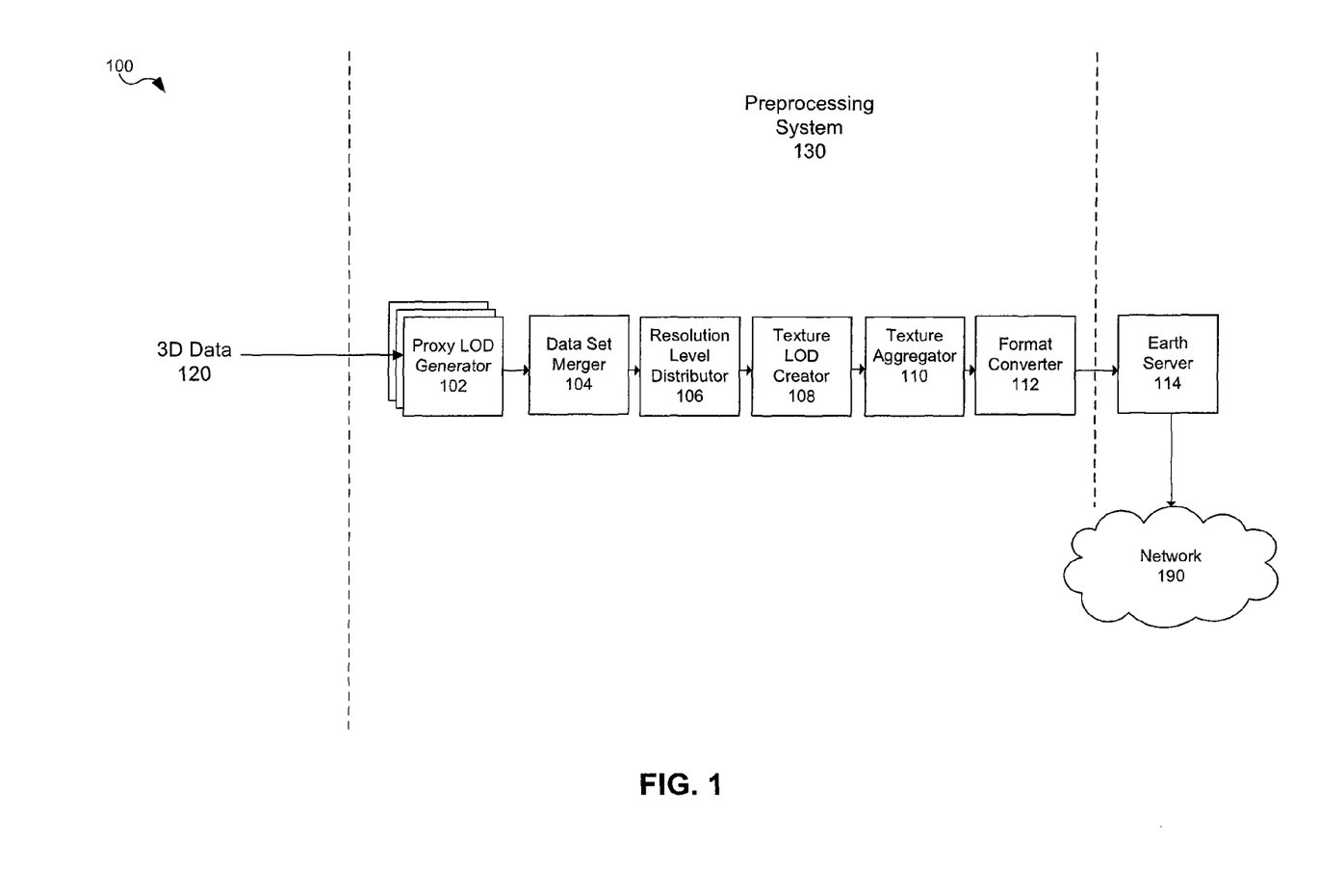
FIG. 1 is a diagram of a system suitable for compressing three dimensional geometry according to an embodiment of the present invention.

This section describes a system suitable for compressing and decompressing geometry. FIG. 1 is an architecture diagram of a system suitable for compressing geometry according to an embodiment of the present invention. FIG. 1 shows system 100. System 100 includes a preprocessing system 130. Preprocessing system 130 further includes a proxy level of detail (LOD) generator 102, a data set merger 104, a resolution level distributor 106, a texture LOD creator 108, a texture aggregator 110, and a format converter 112. Preprocessing system 130 may be coupled to an earth server 114. Preprocessing system 130 may communicate with network 190 through earth server 114. In a further embodiment, preprocessing system 130 can also be coupled directly to network 190 through connections not shown for clarity.

In an embodiment, preprocessing system 130 (and its components including a proxy level of detail (LOD) generator 102, a data set merger 104, a resolution level distributor 106, a texture LOD creator 108, a texture aggregator 110, and a format converter 112) can include pipelined processing or other processing arrangements to carry out its tasks as would be apparent to a person skilled in the art given this description.

Preprocessing system 130 may be implemented on a computing device. Such a computing device can include, but is not limited to, a personal computer, mobile device such as a mobile phone, workstation, embedded system, game console, television, or set-top box. Such a computing device may include, but is not limited to, a device having one or more processors and memory for executing and storing instructions. Such a computing device may include software, firmware, hardware, or a combination thereof. Software may include one or more applications and an operating system. Hardware can include, but is not limited to, a processor, memory and graphical user interface display. Preprocessing system 130 can also be implemented on a plurality of computing devices.

Network 190 may be any type of network or combination of networks that can carry data communication. Such network 190 can include, but is not limited to, a local area network, medium area network and/or wide area network such as the Internet. Network 190 may be in a form of a wired network or a wireless network. Network 190 can support protocols and technology including, but not limited to, World Wide Web protocols and/or services. Intermediate web servers, gateways, or other servers may be provided between components of system 100 depending upon a particular application or environment. In an embodiment, earth server 114 may communicate over network 190.

Proxy LOD generator 102 receives three dimensional data 120. Three dimensional data 120 may include image data from various sources, including, but not limited to, LIDAR (Light Detection and Ranging) imagery, user contributed data, topographic data, and street and aerial imagery. In an embodiment, proxy LOD generator 102 uses three dimensional data 120 to generate proxy LODs. Proxy LOD generation is described in greater detail in Application No. 61/044,865, filed Apr. 14, 2008, entitled "Proxy Based Approach For Generation of Level of Detail," which is incorporated herein by reference in its entirety.

Data set merger 104 merges textures associated with three dimensional data 120 obtained from a plurality of sources into one or more data sets.

Resolution level distributor 106 may distribute the one or more objects of interest included in the datasets obtained from data set merger 104 and the proxy LODs generated by proxy LOD generator 102 to various resolution levels of a geo-spatial quadtree.

Texture LOD creator 108 generates a resolution pyramid for each texture used by the objects of interest. In an embodiment, texture LOD creator 108 may store each texture having a certain resolution at a node of the geo-spatial quadtree, where the resolution of a texture level as applied to an object of interest approximately corresponds to the resolution of the quadtree node where it is stored. For example, the resolution of the texture level as applied to the object of interest may be 1 meter per pixel and the resolution of the quadtree node where it is stored may be 0.6 meters per pixel.

Texture aggregator 110 aggregates a plurality of textures at multiple resolutions, creating several texture trees or a forest. Each texture tree is associated with a set of objects (for example, buildings) made up of triangles (corresponding to façades, roofs, etc). In an embodiment, texture aggregator 110 may store each texture having a certain resolution at a node of a multi-resolution spatial data structure organizing the objects of interest. The multi-resolution spatial data structure may be, for example, a quadtree. Textures having the same resolution when applied to an object of interest may share a common level in the quadtree.

Each node in a texture tree represents an aggregated atlas texture at a given resolution. The texture at the given resolution can have zero or more children, containing textures at double the resolution in each of the two texture dimensions. Such child textures can replace a rectangular sub-region of a parent node texture. In an embodiment, the sub-regions corresponding to different child nodes do not overlap.

In an embodiment, the objects of interest using textures from a given LOD tree in the forest are stored at the same geo-spatial quadtree node where the root of the texture is also stored.

Format converter 112 may convert the textures aggregated by texture aggregator 110 into a format used by earth server 114 to transmit the textures over network 190. As an example, format converter 112 may convert textures to the JPEG 2000 image format. JPEG 2000 is an image compression standard known to those skilled in the art.

Earth server 114 may transmit both textures and three dimensional geometries over network 190. At run time, for example, earth server 114 may fulfill requests made by client 210. In one exemplary embodiment, earth server 114 may include a web server or may be coupled to communicate with a web server at the same or a different location. A web server is a software component that responds to a hypertext transfer protocol (HTTP) request with an HTTP response. As illustrative examples, the web server may be, without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include hypertext markup language (HTML), extensible markup language (XML), documents, videos, images, multimedia features, or any combination thereof. This example is strictly illustrative and does not limit the present invention. Earth server 114 is described in greater detail below with respect to FIG. 3.

Figure 2:
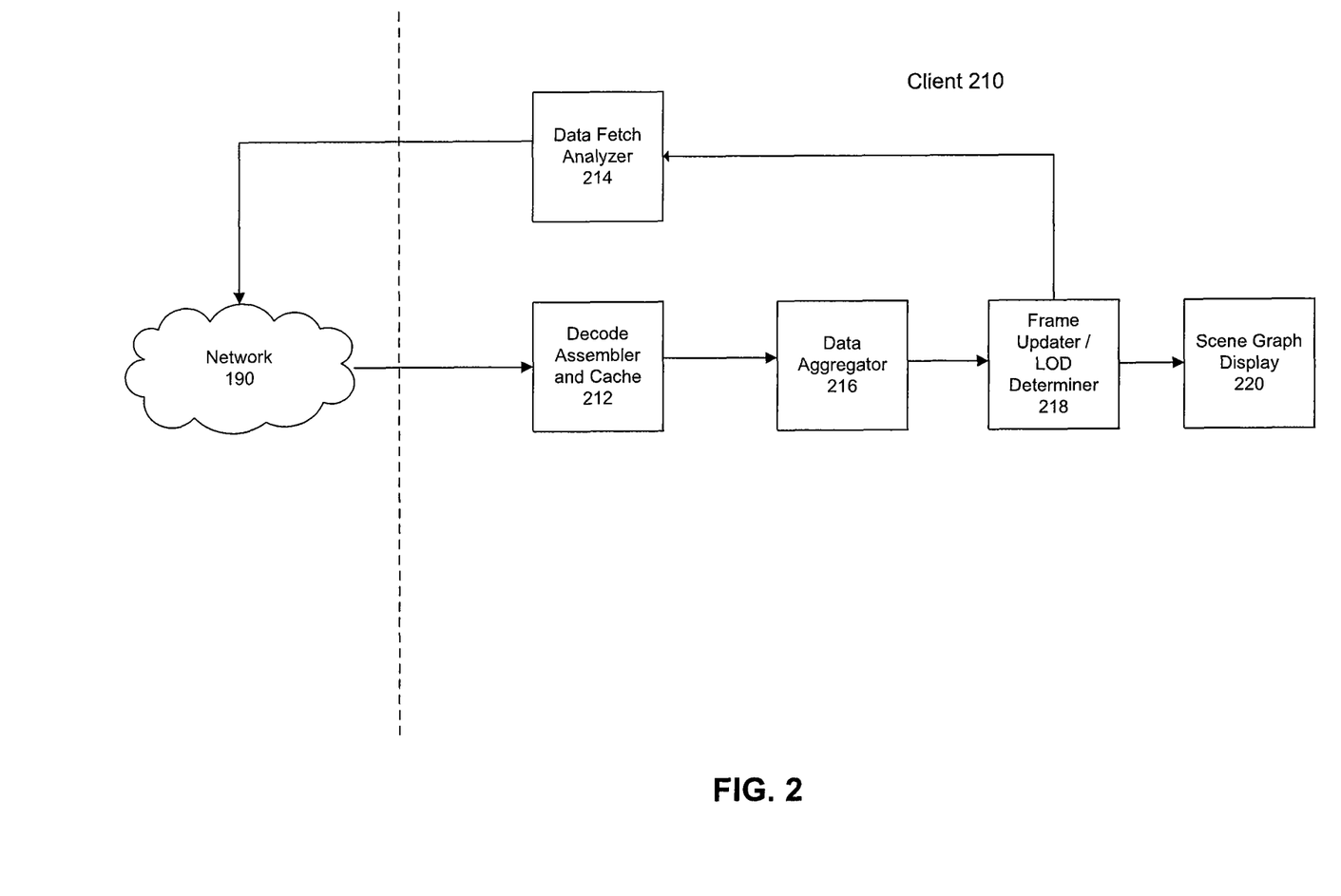
FIG. 2 is a diagram of a system suitable for decompressing three dimensional geometry according to an embodiment of the present invention.

In an embodiment, client 210 processes a texture forest generated by preprocessing system 130 and transmitted in part by earth server 114 over network 190. Client 210 may choose which texture resolution to use when rendering a part of an object of interest and use the same single set of texture coordinates for all possible resolutions of that texture in the texture tree. Pre-vertex texture coordinates need not be computed at each resolution level while traversing the texture tree.

In an embodiment, the nodes of texture trees may be associated with the nodes of a spatial structure, such as, for example, a quadtree. Since it may be impractical to transmit the whole texture forest over a network to a client, such as from network 190 to client 210, the client can use the geo-spatial quadtree to decide what parts of the forest to fetch. In other words, the client may only download the parts of the forest that may be needed to render the scene currently in view.

FIG. 2 illustrates an architecture diagram of a system suitable for decompressing geometry according to an embodiment of the present invention. FIG. 2 shows system 200. System 200 includes client 210. Client 210 includes a decode assembler and cache 212, a data fetch analyzer 214, a data aggregator 216, a frame updater/LOD determiner 218, and a scene graph display 220.

In an embodiment, preprocessing system 130 transmits data over network 190. Data transmitted by preprocessing system 130 over network 190 may be received by client 210.

Client 210 may be implemented on a computing device. Such a computing device can include, but is not limited to, a personal computer, mobile device such as a mobile phone, workstation, embedded system, game console, television, or set-top box. Such a computing device may include, but is not limited to, a device having one or more processors and memory for executing and storing instructions. Such a computing device may include software, firmware, hardware, or a combination thereof. Software may include one or more applications and an operating system. Hardware can include, but is not limited to, a processor, memory and graphical user interface display. Client 210 may also be implemented across multiple computing devices.

In an embodiment, decode assembler and cache 212 receives data from network 190. As an example, this data may comprise three dimensional data relating to geometries of various objects of interest in a scene. Furthermore, data may comprise image data in highly compressed formats, such as, for example, the JPEG 2000 format. As an example, decode assembler and cache 212 may convert the data from a received format to another format that may be less efficiently compressed, but more suitable for direct rendering by client 210. Additionally decode assembler and cache 212 may assemble and store the decoded data into data sets that may be used by client 210 for further processing. Decode assembler and cache 212 is described in greater detail below with respect to FIG. 4.

Data fetch analyzer 214 processes each node of the geospatial quadtree that intersects the current view to be rendered by client 210 and whose resolution is not too detailed for the current view. Data fetch analyzer 214 downloads metadata for these quadtree nodes from earth server 114. The quadtree node metadata may indicate that the quadtree nodes contain geometric objects or textures, which are then downloaded.

Data aggregator 216 may receive a plurality of data sets that includes texture and geometry data relating to objects of interest and other objects in a scene. Data aggregator 216 may then aggregate the data sets before they are provided to frame updater/LOD determiner 218. As an example, data aggregator 216 may further aggregate textures and geometric objects using the same texture trees described above. Aggregation of various data sets may improve efficiency of client 210.

Similarly to textures having multiple resolution levels organized in a tree, geometric objects may have multiple, progressively more complicated representations organized in LOD trees. For example, coarse representations of objects may be generated preprocessing system 130 by proxy LOD generator 102. Frame updater/LOD determiner 218 processes a plurality of geometry LOD trees and texture trees received from data aggregator 216. In an embodiment, frame updater/LOD determiner 218 may determine LODs for all geometry and texture objects and update LODs that have been determined.

In an embodiment, a scene graph may be considered a representation that includes information about the geometry and appearance of all objects appearing on a graphical display. As an example, a scene graph may be a dynamic data structure within a computer program. A scene graph may include data that describes shape objects (geometry and appearance), geometric structure relationships (geometric transformations, ordering, and grouping), global objects (how all shape objects are viewed, e.g. viewpoints, lights, backgrounds), and behaviors (procedures for modifying information stored in a scene graph).

As an example, not intended to limit the invention, a scene graph is implemented using object-oriented computer programming techniques. Thus, scene graph objects can be provided as object-oriented software objects, which may describe shape objects. For example, a scene graph can include a software object associated with an building image, and a scene graph display command can operate on the building object to render the building image on a graphical display.

Objects of a scene graph, for example, may be generated using software commands, for example a "create" command. The objects of a scene graph are operated upon using other commands, for example a "render" command, which causes an object to appear as an image on a video screen. Therefore, the scene graph, including the objects, is associated with a set of scene graph display commands.

A scene graph can be represented diagrammatically as a tree structure having "nodes" and interconnecting lines or "arcs." The scene graph data structure described above underlies the tree structure representation. The scene graph can also be associated with a sequence of display commands, which can be used to generate the underlying data structure of the scene graph.

It should be understood that a scene graph can be associated with more scene graph display commands than actually are used to generate images on a graphical display. For example, a scene graph can be associated with a set of "create" commands that represent scene graph objects, and not every object necessarily has a corresponding "render" command that generates an image on the graphical display.

Various high-level software application programmer interfaces (APIs) have been established to create a scene graph when presented with the scene graph display commands. For example Java3D and VRML provide high-level software to generate a scene graph. Lower level APIs have also been provided, including Open GL, and Direct 3D. Application software, for example computer games, has been developed to provide the scene graph display command to an API.

In an embodiment, a scene graph generated and updated by frame updater/LOD determiner 218 may be provided to scene graph display 220. Scene graph display 220 renders a scene graph for display so that a scene may be viewed by a user of client 210.

As an example, scene graph display 220 may be associated with a 3D graphics circuit board having local processing capability, and the ability to interpret scene graph data and rapidly provide a corresponding graphical display on a monitor.

Exemplary scene graph programming techniques, in conjunction with the 3D graphic circuit board, provide the ability to rapidly render a 3D image on a graphical display. Images on the graphical display can also be rapidly updated with one or more display commands, provided by the application software, interpreted by the API, and sent to the 3D graphics circuit board.

Figure 3:
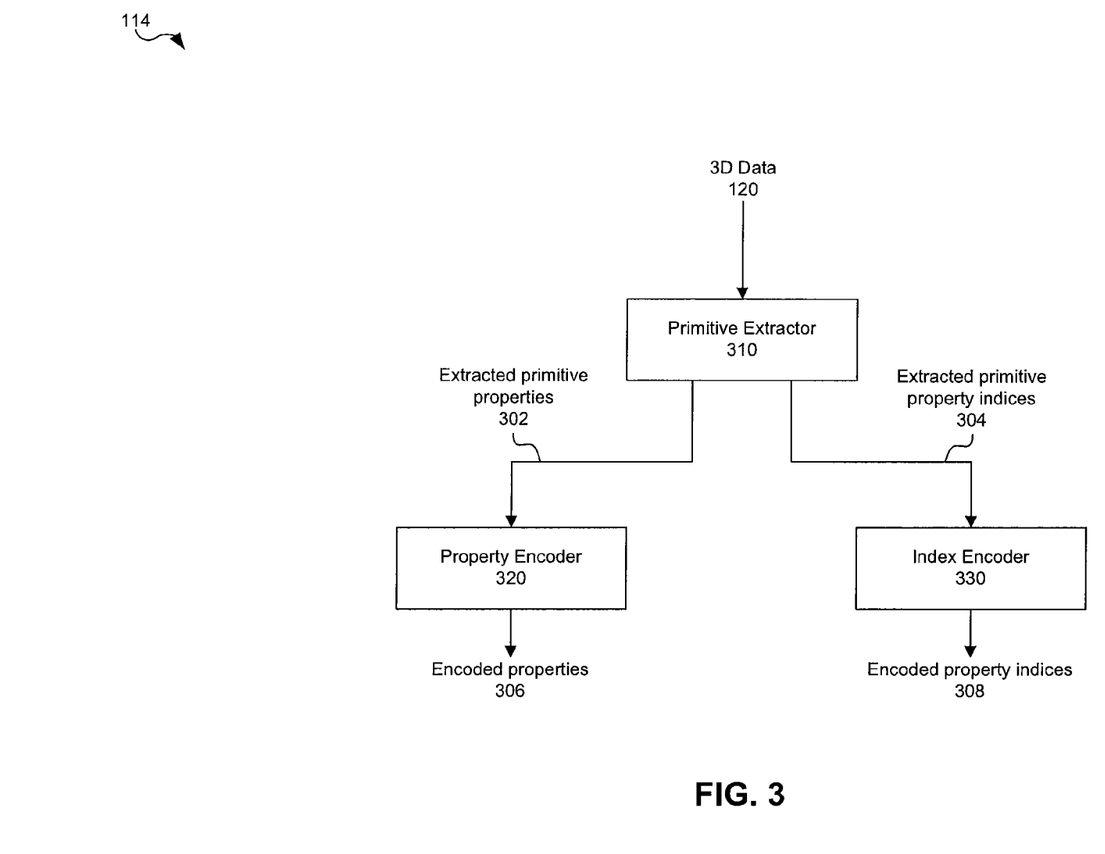
FIG. 3 is a more detailed diagram of a component in the system in FIG. 1, according to an embodiment of the present invention.

FIG. 3 is a more detailed diagram of system 100 in FIG. 1, according to an embodiment of the present invention. In an embodiment, earth server 114 includes a primitive extractor 310, a property encoder 320, and an index encoder 330. Primitive extractor 310 extracts at least one primitive from received three dimensional data relating to geometries of objects, such as three dimensional data 120. Three dimensional data 120 may be passed directly to earth server 114, or may be passed through the other modules in preprocessing system 130 before reaching earth server 114.

A primitive may be any two dimensional polygon, such as, for example, a triangle or a rectangle, that can be combined with other primitives to form three dimensional objects. Each primitive consists of property indices that associate properties with vertices. In an example, each vertex may consist of a point index, a normals index, and a texture coordinates index, which refer to the following properties: points, normals, and texture coordinates, respectively. Points indicate a location of the primitive in a three dimensional environment, normals indicate an orientation of the primitive in the three dimensional environment, and texture coordinates indicate a position of any texture that may be mapped onto the primitive.

Primitive extractor 310 transmits the properties associated with each extracted primitive to property encoder 320 in the form of extracted primitive properties 302. Primitive extractor 310, at a same or different time, also transmits the property indices associated with each extracted primitive to index encoder 330 in the form of extracted primitive property indices 304.

Property encoder 320 functions to reduce the bit size of the properties prior to transmission over a network, such as network 190 of FIG. 1. In an embodiment, property encoder 320 receives extracted primitive properties 302 from primitive extractor 310 and quantizes each property to a fixed grid. For example, points, normals, and texture coordinates may be translated from a global coordinate system to a local coordinate system. Unlike a local coordinate system, a global coordinate system takes into account the entire three dimensional environment. In applications where the three dimensional environment is sufficiently large, such as, for example, an environment that covers the effective surface area of Earth, a large number of bits is needed to place objects with good precision. If data is being streamed over a network, such as network 190, transmitting a large number of bits for each object may slow performance of the rendering client, such as client 210. On the other hand, the local coordinate system is localized to a single tile in the three dimensional environment, where the tile contains the particular object being analyzed. A tile may have a set length and width based on the view resolution and cover a portion of the surface area of the three dimensional environment. In an embodiment, each tile is associated with a node in a quadtree.

In one example, the local coordinate system is positioned at a designated location, such as the center of the tile, where the local coordinate system is a Cartesian coordinate system. The bits needed to position the primitives that make up the object with good precision has greatly been reduced since an association between the object and tile has already been established by the quadtree structures mentioned above. The number of bits needed is then a function of the size of the tile, not the entire three dimensional environment.

Note that the presence of a local coordinate system eliminates the need for a rotation matrix. Since three dimensional environments allow for rotation and tilt, a rotation matrix normally may be necessary to account for any rotation and/or tilt in order to properly position objects. However, in the local coordinate system, objects may be naturally oriented with Z as an up direction, so these extra calculations are unnecessary.

Also note that any objects that fall within the same tile share the same coordinate system. Thus, these objects can be combined into a single vertex buffer when rendering without the need for transformation matrices between them.

Overall, quantization helps reduce the number of bits necessary to properly display the primitives that make up objects. Along with the quantization described above, in one embodiment, each property is converted from a float data type to an integer data type. Again, this conversion may reduce the number of bits used to represent each property. Once the quantization and conversion have been completed, property encoder 320 sends encoded properties 306 to network 190.

Index encoder 330 functions to reduce the bit size of the data necessary to represent the property indices prior to transmission over a network, such as network 190. In an embodiment, index encoder 330 takes extracted primitive property indices 304 and attempts to create an array of property indices and delimiters. Delimiters are used to separate the property indices of primitives and are necessary to separate polygons of more than three sides from other primitives. Polygons of more than three sides are also known as variable stride primitives. Fixed stride primitives, such as lines and triangles, do not require delimiters to mark separation from other primitives. Furthermore, for example, delimiters are needed when primitives vary in size and may not be needed when all primitives are of the same size. A delimiter, for example, is identified by the integer −1 in the array or may be identified by any other value (e.g. an out-of-range value). Property indices are greater than or equal to the integer value zero and less than an integer value that represents the total number of properties included in all extracted primitives.

Using the completed array, an encoding algorithm appends offsets to each property index. In an embodiment, each property index is taken in the order they appear in the array and a check is performed to see if the same property index has appeared earlier in the array. This check may be performed using any known data structure search algorithm. Alternatively, a database may keep track of those indices that have previously been encoded along with their position in the array. A query may be performed on the database to identify those previously encoded indices. As used herein, the term "database" includes, but is not limited to, table databases, hierarchical databases, network databases, relational databases, dimensional databases, and object databases.

If the property index has previously appeared in the array, an offset value identifying a difference between the current position of the property index and an earlier position of the property index in the array is appended to the last entry of the property index. In an embodiment, the property index that the offset value is appended to is set to zero. This is possible without losing primitive data because of the decoding algorithm described below with respect to FIG. 4. Setting the property index to zero may reduce the number of transmitted bits. If the property index has not previously appeared in the array, then an offset value of integer value zero is appended to the last entry of the property index. In an embodiment, this offset value is encoded as a variable bit length integer coding. This means small offset values takes up fewer bits than larger offset values.

Note that if all property indices are unique, then all offset values would be zero. However, this may not be the case since many primitives that combine to form objects share properties. As an example, on average, six primitives may share a given property index.

Because property indices may be shared multiple times and the offset values are of a variable bit length, index encoder 330 may preorder the property indices. In a first embodiment, the ordering may be completed such that those property indices that are most common are inserted at the beginning of the array, with those least common property indices inserted at the end of the array. This ensures that the repeated offset values represent lower integer values, reducing the number of bits needed as the property indices are repeated. In a second embodiment, the ordering may be completed such that those property indices that are most common are grouped together anywhere in the array. This also may ensure that the repeated offset values represent lower integer values, reducing the number of bits needed as the property indices are repeated. In a third embodiment, the property indices that pertain to the same primitive may remain grouped together. The property indices of primitives that consist of property indices shared by many primitives may be positioned earlier in the array and the property indices of primitives that consist of property indices shared by few primitives may be positioned later in the array.

In an embodiment, once index encoder 330 has appended an offset to each property index, another reordering may occur which renumbers each property index based on the order they first appear in the array. An example of this renumbering is described and illustrated with respect to FIGS. 7A-B below.

The final encoded property indices are transmitted over network 190 as encoded property indices 308. Note that property encoder 320 and index encoder 330 may function serially or in parallel. The encoders may operate in any order if performed serially.

Each of primitive extractor 310, property encoder 320, and index encoder 330 may be implemented as software, hardware, firmware, or any combination thereof.

Figure 4:
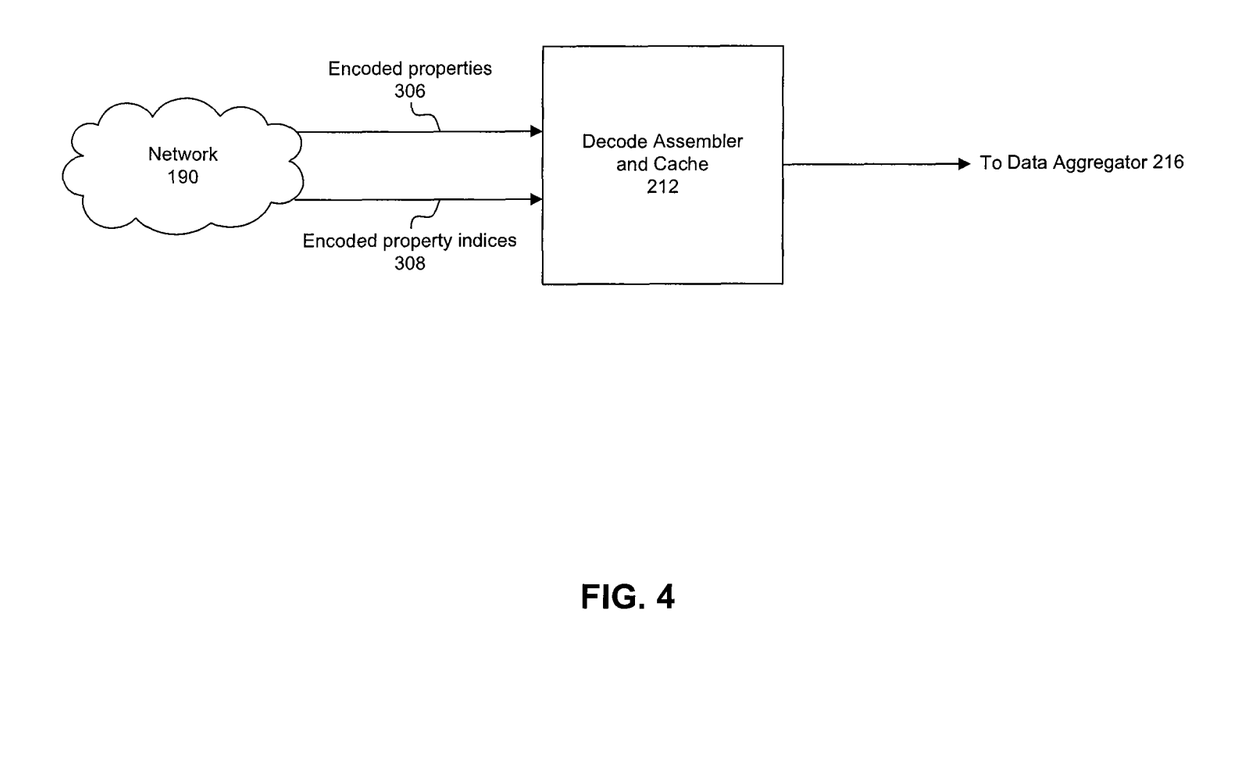
FIG. 4 is a more detailed diagram of a component in the system in FIG. 2, according to an embodiment of the present invention.

FIG. 4 is a more detailed diagram of system 200 in FIG. 2, according to an embodiment of the present invention. In an embodiment, decode assembler and cache 212 receives encoded properties 306 and encoded property indices 308 from earth server 114 through network 190. Using both inputs, decode assembler and cache 212 performs an algorithm to decode the encoded property indices in order to recreate the array of property indices. Each offset value encountered in encoded property indices 308 is evaluated to determine whether it represents an integer value of zero or an integer value greater than zero. If an offset value represents an integer value of zero, then the property index appended to the offset value is extracted and added as a new property index to an array of property indices. If an offset value represents an integer value greater than zero, then the previously decoded property index that is at a location identified by a difference between the current position of the offset value and the offset value is reused and placed in the array of property indices. In this case, the property index appended to the offset value, which may have been set to zero, does not play a role in the generation of the array of property indices.

Each of the property indices in the generated array of property indices associates a vertex of a primitive with the properties in encoded properties 306. Note that the properties in encoded properties 306 may not have to be decoded. By leaving the properties in their encoded state, client 210 can take advantage of the local coordinate system benefits described above with respect to FIG. 3. Decode assembler and cache 212 sends its results to data aggregator 216.

In this way, primitive properties and property indices may be compressed in order to reduce the number of bits transmitted over a network, while ensuring the primitives may be recreated once all the data has reached its destination.

Method

Figure 5:
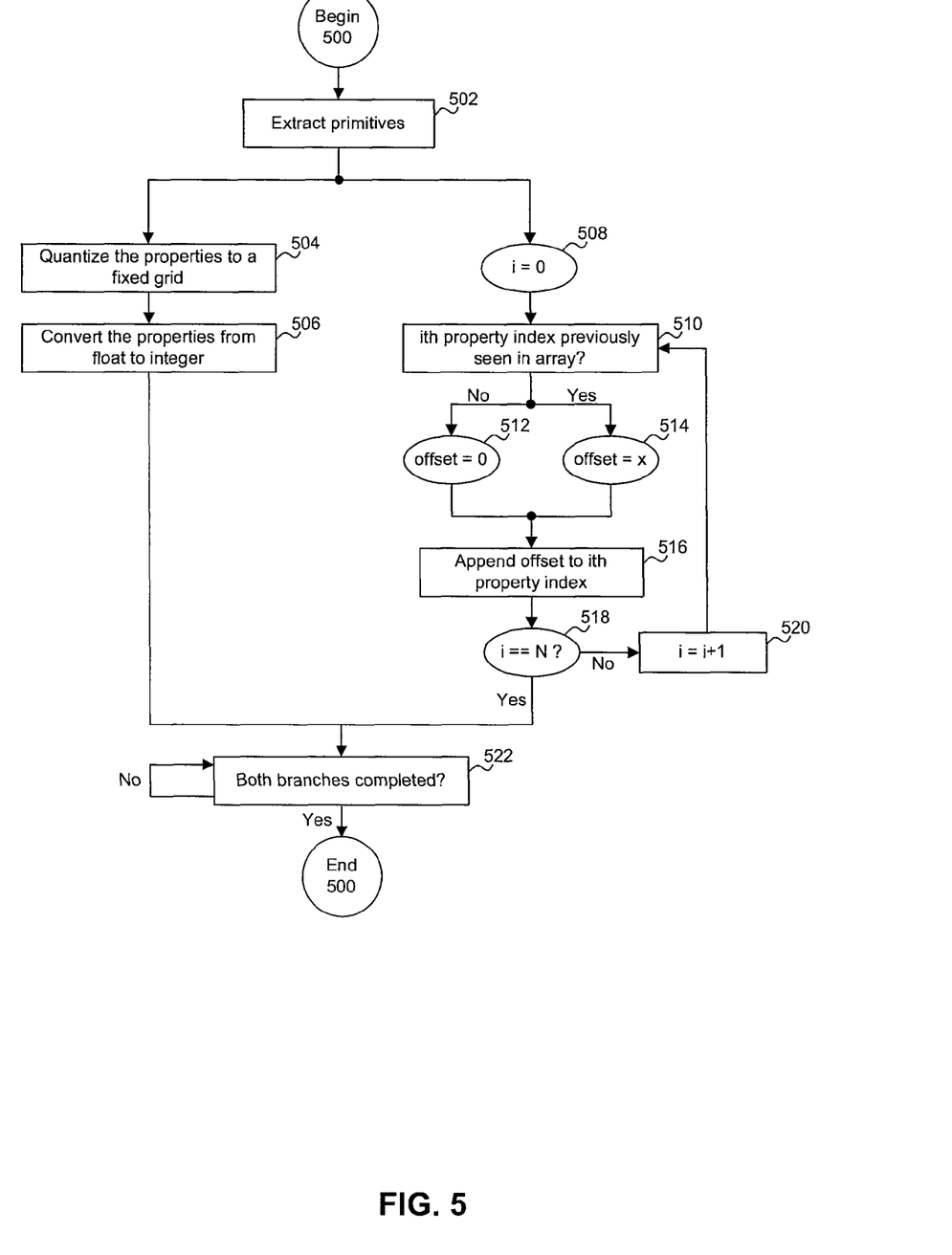
FIG. 5 is a flowchart of a method for geometry compression according to an embodiment of the present invention.

This section describes a method used for encoding and decoding three dimensional geometry. FIG. 5 is a flowchart of a method 500 for geometry compression according to an embodiment of the present invention. While method 500 is described with respect to an embodiment of the present invention, method 500 is not meant to be limited to the present invention and may be used in other applications. In an example, method 500 may be used to encode three dimensional geometry data in earth server 114 from FIGS. 1 and 3. However, method 500 is not meant to be limited to earth server 114. As shown in FIG. 5, method 500 begins at stage 502 where primitives are extracted from three dimensional geometry. In an embodiment, the primitives may contain properties for each primitive vertex and property indices that associate each property with each vertex. Once stage 502 is complete, method 500 proceeds to stage 504 and/or stage 508.

At stage 504, the properties of each primitive are quantized to a fixed grid. In an embodiment, the fixed grid may be a local coordinate system such as is described above with respect to FIG. 3.

Method 500 proceeds to stage 506 once stage 504 is complete. At stage 506, the properties are converted from a float data type to an integer data type. Once stage 506 is complete, method 500 jumps to stage 522.

In an alternate embodiment, not shown, stage 506 is completed before stage 504. In this case, method 500 jumps to stage 522 once stage 504 is complete.

At a same or different time as the execution of stages 504 and 506, stages 508, 510, 512, 514, 516, 518, and/or 520 may be completed. At stage 508, variable i is set to be equal to zero. Once stage 508 is complete, method 500 proceeds to stage 510.

At stage 510, a data structure search or a query on a database is performed to determine whether the ith property index has previously been seen in an array of property indices at an array index less than i. If the ith property index has not been seen in the array, method 500 proceeds to stage 512. If the ith property index has been seen in the array, method 500 proceeds to stage 514.

In an alternate embodiment, not shown, the array of property indices is ordered prior to stage 510. The ordering may be completed in the ways described above with respect to FIG. 3.

At stage 512, variable offset is set to be equal to zero. Once stage 512 is complete, method 500 jumps to stage 516.

At stage 514, variable offset is set to be equal to x, where x is a value representing a difference between the current position in the array, i, and a position in the array the ith property index was previously seen in the array. In an embodiment, if the ith property index was previously seen multiple times in the array, then the position closest to i is chosen. Once stage 514 is complete, method 500 proceeds to stage 516.

At stage 516, offset is appended to the last entry of the ith property index. For example, the ith property index may be an array, and offset may be inserted into the last entry of the array. Once stage 516 is complete, method 500 proceeds to stage 518.

At stage 518, a check is performed to see if i equals N, where N represents the total sum of the number of properties each primitive contains. If i and N are equal, method 500 jumps to stage 522. If i and N are not equal, method 500 proceeds to stage 520.

At stage 520, i is incremented by one. Once this is complete, method 500 returns to stage 510.

At stage 522, a check is performed to see if both branches of method 500 have been completed. In other words, a check is performed to see if stages 504, 506, 508, 510, 512, 514, 516, 518, and 520 have all been completed. If all stages prior to stage 522 have been completed, method 500 ends. Otherwise, method 500 repeats stage 522.

Stages 502, 504, 506, 508, 510, 512, 514, 516, 518, 520, and 522 may be implemented as software, hardware, firmware, or any combination thereof.

Figure 6:
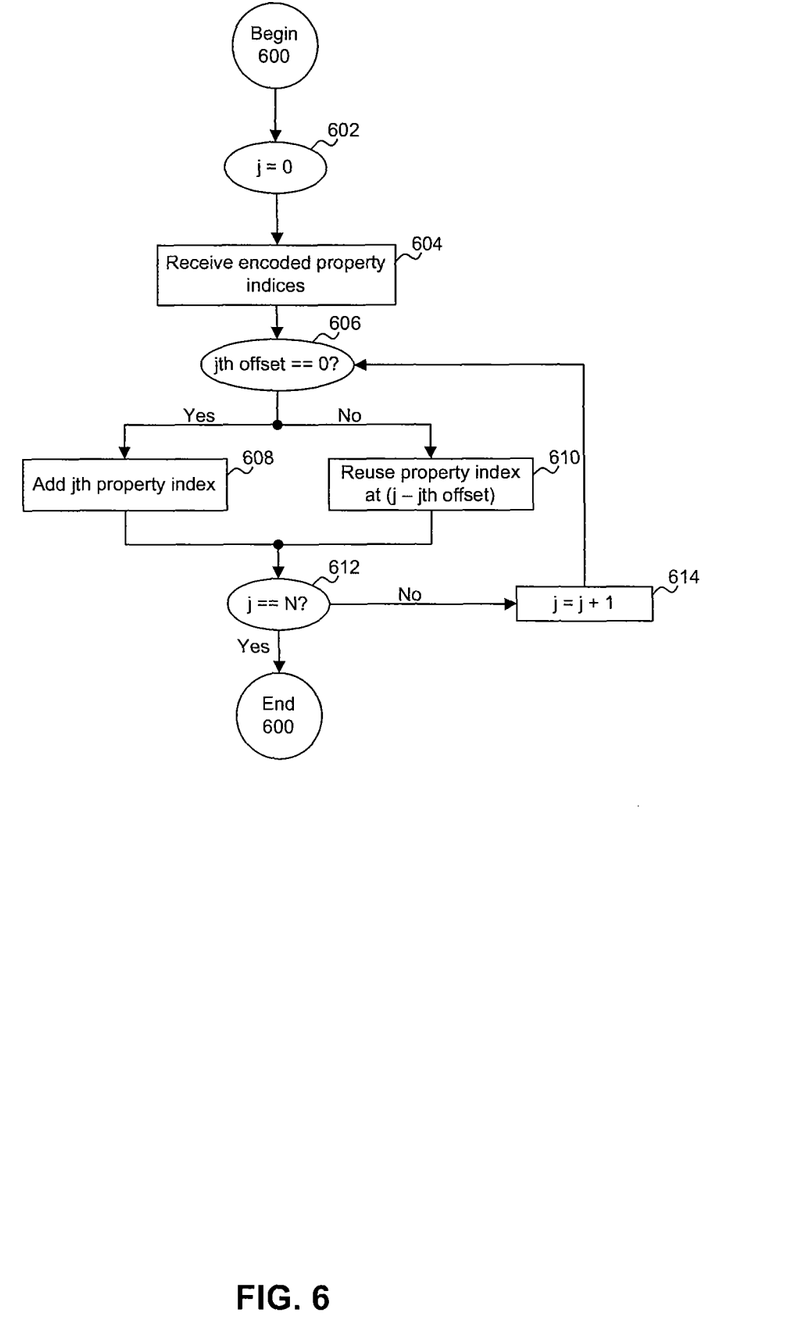
FIG. 6 is a flowchart of a method for geometry decompression according to an embodiment of the present invention.

FIG. 6 is a flowchart of a method 600 for geometry decompression according to an embodiment of the present invention. While method 600 is described with respect to an embodiment of the present invention, method 600 is not meant to be limited to the present invention and may be used in other applications. In an example, method 600 may be used to decompress three dimensional geometry in decode assembler and cache 212 from FIGS. 2 and 4. However, method 600 is not meant to be limited to decode assembler and cache 212. As shown in FIG. 6, method 600 begins at stage 602 where variable j is set to be equal to zero.

Once stage 602 is complete, method 600 proceeds to stage 604 where encoded property indices are received. In an alternate embodiment, not shown, stage 604 may be completed before stage 602. Once stage 604 is complete, method 600 proceeds to stage 606.

At stage 606, a check is performed to see if the jth offset in the encoded property indices is equal to zero. If the jth offset is zero, method 600 proceeds to stage 608. If the jth offset is not zero, method 600 jumps to stage 610.

At stage 608, the jth property index is extracted from the encoded property indices and added to an array of property indices. Once this is complete, method 600 jumps to stage 612.

At stage 610, the property index at a position of j minus the value of the jth offset is reused and placed in the array of property indices. Once this is complete, method 600 proceeds to stage 612.

At stage 612, a check is performed to see if j equals N, where N again represents the total sum of the number of properties each primitive contains. If j and N are equal, method 600 ends. If j and N are not equal, method 600 proceeds to stage 614.

At stage 614, j is incremented by one. Once this is complete, method 600 returns to stage 606.

Stages 602, 604, 606, 608, 610, 612, and 614 may be implemented as software, hardware, firmware, or any combination thereof.

Figure 7A:
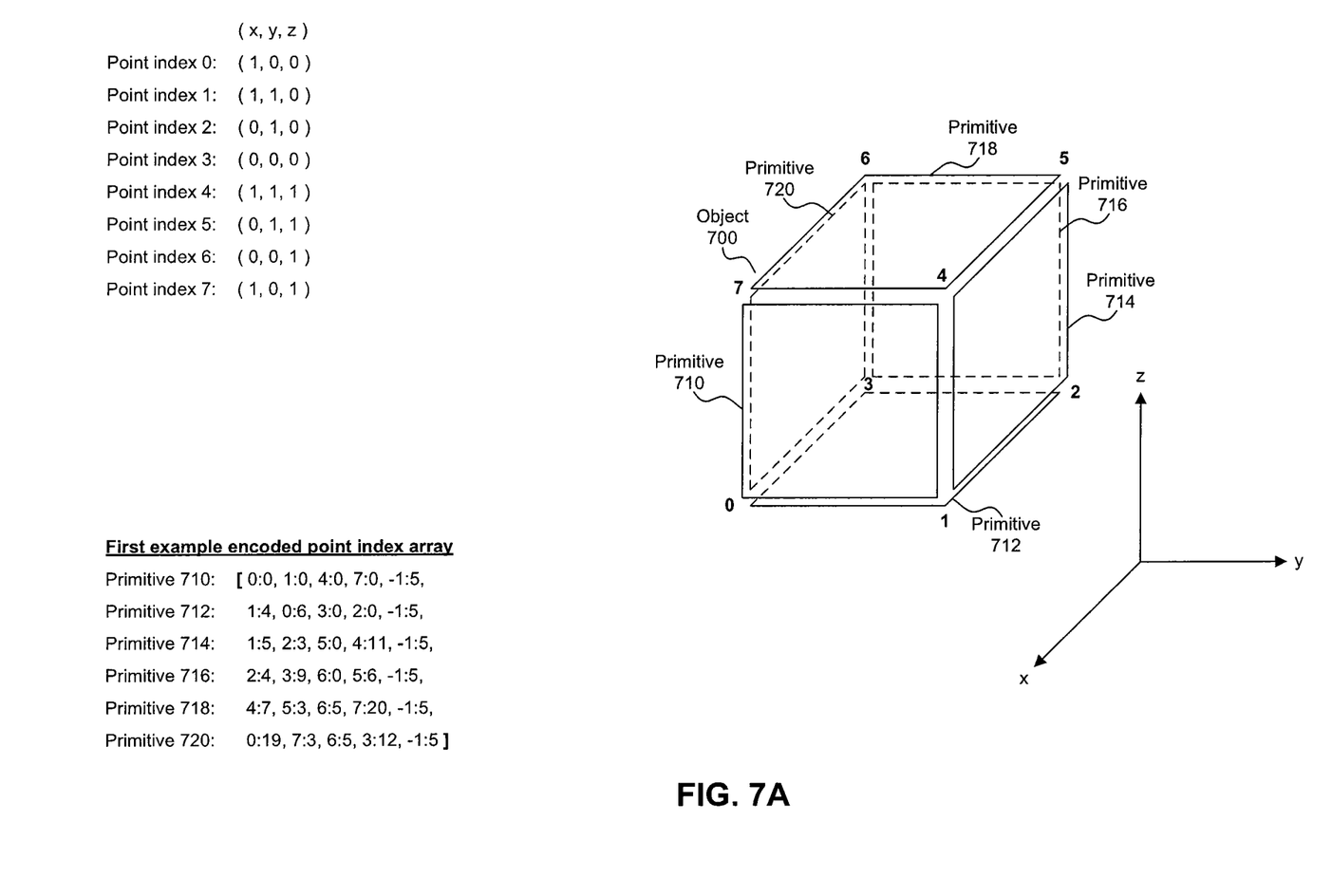
FIGS. 7A-B illustrate an example geometry compression according to an embodiment of the present invention.
Figure 7B:
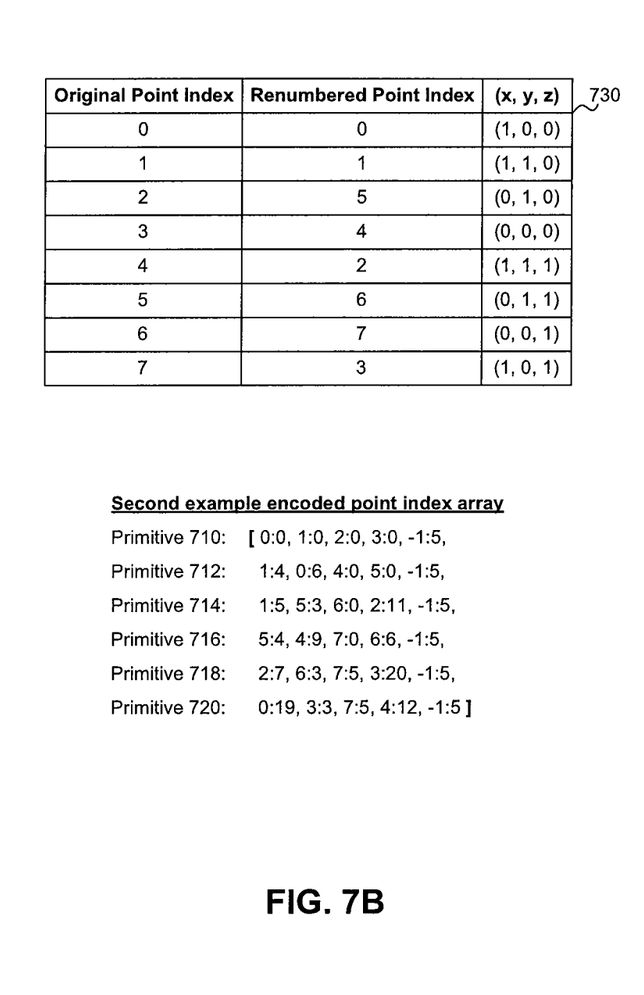

FIGS. 7A-B is an example geometry compression according to an embodiment of the present invention. As an example, FIGS. 7A-B may graphically represent method 500 of FIG. 5. In this case, FIG. 7A shows object 700. Object 700 includes primitives 710, 712, 714, 716, 718, and 720.

Object 700 is placed in a tile using a local coordinate system, where object 700 is oriented up in the z direction. Positions in the local coordinate system are given for each vertex of each primitive in the upper left portion of FIG. 7A, where each position is associated with a point index that identifies the given vertex. For example, primitive 710 contains point indices of 0, 1, 4, and 7 that are associated with points (1,0,0), (1,1,0), (1,1,1), and (1,0,1), respectively. Note that only points and point indices are illustrated in FIG. 7A, however the same techniques apply for other properties, such as normals and texture coordinates, and property indices.

At the bottom left of FIG. 7A, a first example encoded point index array is given, organized by primitive, with the first entry for primitive 710 being array position one, the first entry for primitive 712 being array position six, and so on. Along with each point index, an offset has been included, where the point index and offset corresponding to the point index have been separated by a colon. Each point index and offset pair is separated by a comma. For each point index that appears for the first time in the array, an offset of zero is appended to the given property index. If the point index has appeared before in the array, an offset is appended identifying how far back from the current position the position of the previous instance of the point index is in the array. Note that at the end of each sequence of encoded point indices that correspond to a primitive, a "−1" has been inserted. This value is the delimiter, which is needed since primitives 710, 712, 714, 716, 718, and 720 all have more than three sides.

FIG. 7B shows a second example encoded point index array after the point indices have been reordered. In this example, the reordering consists of renumbering the point indices based on the order they first appeared in the first example encoded point index array of FIG. 7A. Each renumbered point index is associated with its original points, as can be seen in table 730. The second example encoded point index array includes the renumbered point indices along with their offsets. Note that the order of offsets remains unchanged from the first example encoded point index since only the point index numbering changed, not the position of each point index in the array relative to each other.

Also note that in this example, the order of property indices is based on the primitives. Other ordering is possible that may increase or decrease the number of bits used for the offsets.

CONCLUSION

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for compressing three dimensional geometry, comprising:
   (1) extracting at least one primitive from the three dimensional geometry, wherein each extracted primitive includes vertices and property indices that associate properties with the vertices;
   (2) quantizing, for each extracted primitive, the properties to a fixed grid;
   (3) converting, for each extracted primitive, the properties from a first data type to a second data type; and
   (4) encoding property indices in a data structure, including:
      (a) ordering property indices of all extracted primitives in the data structure,
      (b) appending an offset value to a first property index, wherein the offset value depends on a position of the first property index relative to other property indices in the data structure and any previous instances of the first property index in the data structure, and
      (c) repeating step (b) for each property index;
   wherein the encoded property indices are based on any multiple occurrences of the respective property index in the data structure and a position of the respective property index relative to other property indices in the data structure, and wherein the encoded property indices and quantized, converted properties are transmitted via a communication network in order to display the three dimensional geometry.

2. The method of claim 1, wherein each property index is one of a point index, a normals index, and a texture coordinates index.

3. The method of claim 2, wherein points associated with the vertices by the point index are expressed in a local coordinate system.

4. The method of claim 3, wherein the local coordinate system is a Cartesian coordinate system positioned at a center of a tile that contains an object, and wherein the object includes the vertices of at least one extracted primitive associated with the points.

5. The method of claim 1, wherein a property index is shared by primitives.

6. The method of claim 1, wherein step (3) comprises:
converting, for each extracted primitive, the properties from a float data type to an integer data type.

7. The method of claim 1, wherein step (4) comprises:
encoding the property indices with delimiters, wherein the delimiters separate indices of extracted primitives that include at least four sides from indices of other extracted primitives.

8. The method of claim 7, wherein encoding property indices in a data structure further includes:
(d) inserting a delimiter after a last property index associated with an extracted primitive containing at least four sides prior to repeating step (b) for a next property index in the array.

9. The method of claim 1, wherein the offset value is zero if the first property index has not previously appeared in the array and is a difference between a current position of the first property index and a position of a previous instance of the first property index if the first property index has previously appeared in the array.

10. A system for compressing three dimensional geometry, comprising:
a primitive extractor, that extracts at least one primitive from the three dimensional geometry, wherein each extracted primitive includes vertices and property indices that associate properties with the vertices;
a property encoder, that, for each extracted primitive, quantizes the properties to a fixed grid, and converts the properties from a first data type to a second data type; and
an index encoder, that encodes property indices in a data structure, wherein the index encoder orders property indices of all extracted primitives the data structure, appends an offset value to a first property index, wherein the offset value depends on a position of the first property index relative to other property indices in the data structure and any previous instances of the first property index in the data structure, and repeats the appending for each property index, wherein the encoded property indices are based on any multiple occurrences of the respective property index in the data structure and a position of the respective property index relative to other property indices in the data structure, and wherein the encoded property indices and quantized, converted properties are transmitted via a communication network in order to display the three dimensional geometry.

11. The system of claim 10, wherein each property index is one of a point index, a normals index, and a texture coordinates index.

12. The system of claim 11, wherein points associated with the vertices by the point index are expressed in a local coordinate system.

13. The system of claim 12, wherein the local coordinate system is a Cartesian coordinate system positioned at a center of a tile that contains an object, and wherein the object includes the vertices of at least one extracted primitive associated with the points.

14. The system of claim 10, wherein a property index is shared by primitives.

15. The system of claim 10, wherein the property encoder converts, for each extracted primitive, the properties from a float data type to an integer data type.

16. The system of claim 10, the index encoder encodes the property indices with delimiters, wherein the delimiters separate indices of extracted primitives that include at least four sides from indices of other extracted primitives.

17. The system of claim 10, wherein the offset value is zero if the first property index has not previously appeared in the array and is a difference between a current position of the first property index and a position of a previous instance of the first property index if the first property index has previously appeared in the array.

18. A computer implemented method for decompressing three dimensional geometry, comprising:
(a) receiving encoded property indices in a data structure, wherein the encoded property indices include offsets associated with each property index, and wherein the offsets are based on and multiple occurrences of each property index in the data structure; and
(b) updating a list of property indices based on each offset, including
(i) checking a value of an offset associated with a first property index,
(ii) finding the first property index based on the value of the offset,
(iii) placing the first property index in the list of property indices, and
(iv) repeating steps (i) through (iii) for each property index and offset pair,
wherein the list of property indices includes property indices extracted from the received encoded property indices.

19. The method of claim 18, wherein step (ii) comprises:
reusing a previously found first property index, wherein a difference between a current position of the first property index and the value of the offset indicates a position of the previously found first property index.

20. The method of claim 18, wherein step (ii) comprises:
extracting the first property index associated with the offset, wherein the value of the offset is zero.

21. The method of claim 1, wherein the data structure is an array.

22. The system of claim 10, wherein the data structure is an array.

* * * * *